(12) United States Patent
Mao et al.

(10) Patent No.: US 10,404,165 B2
(45) Date of Patent: Sep. 3, 2019

(54) ADAPTIVE SWITCHING FREQUENCY ADJUSTMENT FOR A POWER SUPPLY

(71) Applicant: Semtech Corporation, Camarillo, CA (US)

(72) Inventors: Min Mao, Guangdong (CN); Steven M. Granger, Apex, NC (US); Kun Xing, Cary, NC (US)

(73) Assignee: SEMTECH CORPORATION, Camarillo, CA (US)

( * ) Notice: Subject to any disclaimer, the term of this patent is extended or adjusted under 35 U.S.C. 154(b) by 457 days.

(21) Appl. No.: 13/873,399

(22) Filed: Apr. 30, 2013

(65) Prior Publication Data

US 2014/0210441 A1    Jul. 31, 2014

Related U.S. Application Data

(60) Provisional application No. 61/758,038, filed on Jan. 29, 2013.

(51) Int. Cl.
*H02M 3/156* (2006.01)
*H02M 1/00* (2006.01)

(52) U.S. Cl.
CPC .... *H02M 3/156* (2013.01); *H02M 2001/0022* (2013.01)

(58) Field of Classification Search
CPC .... H02M 3/156; H02M 3/158; H02M 3/1584; H02M 3/1588; H02M 2001/0022; Y02B 70/1466
See application file for complete search history.

(56) References Cited

U.S. PATENT DOCUMENTS

| | | | | |
|---|---|---|---|---|
| 6,430,070 B1* | 8/2002 | Shi | .......................... | H02M 1/36 323/271 |
| 6,724,174 B1* | 4/2004 | Esteves | ................. | H02M 3/155 323/224 |
| 2006/0176036 A1* | 8/2006 | Flatness | .............. | H02M 3/1582 323/282 |
| 2007/0279025 A1* | 12/2007 | Xu | ...................... | H02M 3/1588 323/282 |
| 2008/0030178 A1* | 2/2008 | Leonard | ................ | H02M 3/156 323/282 |
| 2010/0134079 A1* | 6/2010 | Liu | ........................ | H02M 3/156 323/282 |
| 2011/0050185 A1* | 3/2011 | Notman | .............. | H02M 3/1588 323/271 |
| 2012/0223693 A1* | 9/2012 | Tang | ...................... | H02M 3/157 323/283 |
| 2012/0274301 A1* | 11/2012 | Nakashima | ......... | H02M 3/1588 323/284 |

\* cited by examiner

*Primary Examiner* — Nguyen Tran
*Assistant Examiner* — Monica Mata
(74) *Attorney, Agent, or Firm* — Amin, Turocy & Watson, LLP

(57) ABSTRACT

Described herein are systems and methods for providing a variable switching frequency for a power supply. The system includes a controller and a filter. The controller generates a switching frequency for a power supply. The switching frequency is modified as a function of an input voltage and an output voltage. The filter provides the output voltage to a load based at least in part on the switching frequency generated by the controller. In one example, the controller adaptively modifies the switching frequency as a function of the input voltage and the output voltage in order to maintain a peak to peak current for an inductor.

19 Claims, 11 Drawing Sheets

ADAPTIVE SWITCHING FREQUENCY ADJUSTMENT FOR A POWER SUPPLY

CROSS REFERENCE TO RELATED APPLICATIONS

This application claims the benefit of U.S. Provisional Application No. 61/758,038, filed Jan. 29, 2013, and entitled "ADAPTIVE SWITCHING FREQUENCY ADJUSTMENT FOR A POWER SUPPLY", the entirety of which is incorporated herein by reference.

TECHNICAL FIELD

This disclosure generally relates to microelectronics and semiconductor circuitry. More specifically, this disclosure relates to power supply controllers and/or power supply regulators.

BACKGROUND

Switching mode power supplies (SMPS) are widely used in electronic equipment due to their high efficiency. Switching frequency of a SMPS is a crucial parameter in designing the power supply since it affects the size of all other components such as switching devices, inductors, capacitors, etc. One switching frequency control method is fixed frequency control. For fixed frequency control, the switching frequency remains constant for all operating conditions. For step-down voltage regulators (e.g., buck voltage regulators), in order to achieve a high output voltage close to its input voltage, a low switching frequency is used to increase duty cycle. However, for a wide input voltage range, when operating at a high input voltage level, the low switching frequency will result in high inductor current ripple. Furthermore, when operating at a high input voltage level, low operation efficiency and/or other performance degradations can occur. For example, a notebook computer power system can receive a 19V input voltage source during an adaptor power mode and a 5.6V input voltage source during a battery power mode. Furthermore, the adaptor power mode and the battery power mode can both be required to provide an output voltage of 5V in order to power a hard disk or USB device. It is therefore desirable for the SMPS to operate at lower switching frequency at low input voltage in order to achieve a large duty cycle, and to increase the switching frequency at higher input voltage to maintain performance of circuits in the SMPS.

However, SMPS are typically designed with a constant switching frequency in order to optimize components for an intended application. For example, with a fixed switching frequency for a SMPS, different inductor values are used for different output voltage levels. In a high volume production environment, a manufacturer is thus required to stock different components (e.g., different inductors for a filter), increasing component management cost and/or component maintenance cost.

SUMMARY

The following presents a simplified summary to provide a basic understanding of some aspects of the subject disclosure. This summary is not an extensive overview of the disclosed subject matter. It is not intended to identify key or critical elements of the disclosed subject matter, nor is it intended to delineate the scope of the subject disclosure or the claims. Its sole purpose is to present some concepts of the disclosed subject matter in a simplified form as a prelude to the more detailed description presented later.

In a non-limiting embodiment of the subject disclosure, a system is described for providing a variable switching frequency for a power supply. The system includes a controller and a filter. The controller generates a switching frequency for a power supply. The switching frequency is modified as a function of an input voltage and an output voltage. The filter provides the output voltage to a load based at least in part on the switching frequency generated by the controller. In one example, the controller adaptively modifies the switching frequency as a function of the input voltage and the output voltage in order to maintain a peak to peak current for an inductor (e.g., an inductor of the filter).

In another non-limiting embodiment of the subject disclosure, a system includes a signal generator and a filter. The signal generator includes an input node, an output node and a switching frequency adjustment node. The output node is electrically coupled to a fixed power source. The switching frequency adjustment node is electrically coupled to an output voltage. The signal generator controls a switching frequency of a power supply as a function of an input voltage and the output voltage. The filter that includes an inductor. The filter generates the output voltage for a load based at least in part on the switching frequency.

Furthermore, in a non-limiting embodiment of the subject disclosure, a method comprises receiving an input voltage and an output voltage and generating a switching frequency as a function of the input voltage and the output voltage. In one example, the method further comprises modifying the switching frequency as a function of a new input voltage and a new output voltage.

The following description and the annexed drawings set forth in detail certain illustrative aspects of the disclosed subject matter. These aspects are indicative, however, of a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of the embodiments of the subject disclosure. One skilled in the relevant art will recognize, however, that the embodiments described herein can be practiced without one or more of the specific details, or with other methods, components, materials, etc. In other instances, well-known structures, materials, or operations are not shown or described in detail to avoid obscuring certain aspects.

Figure 1:
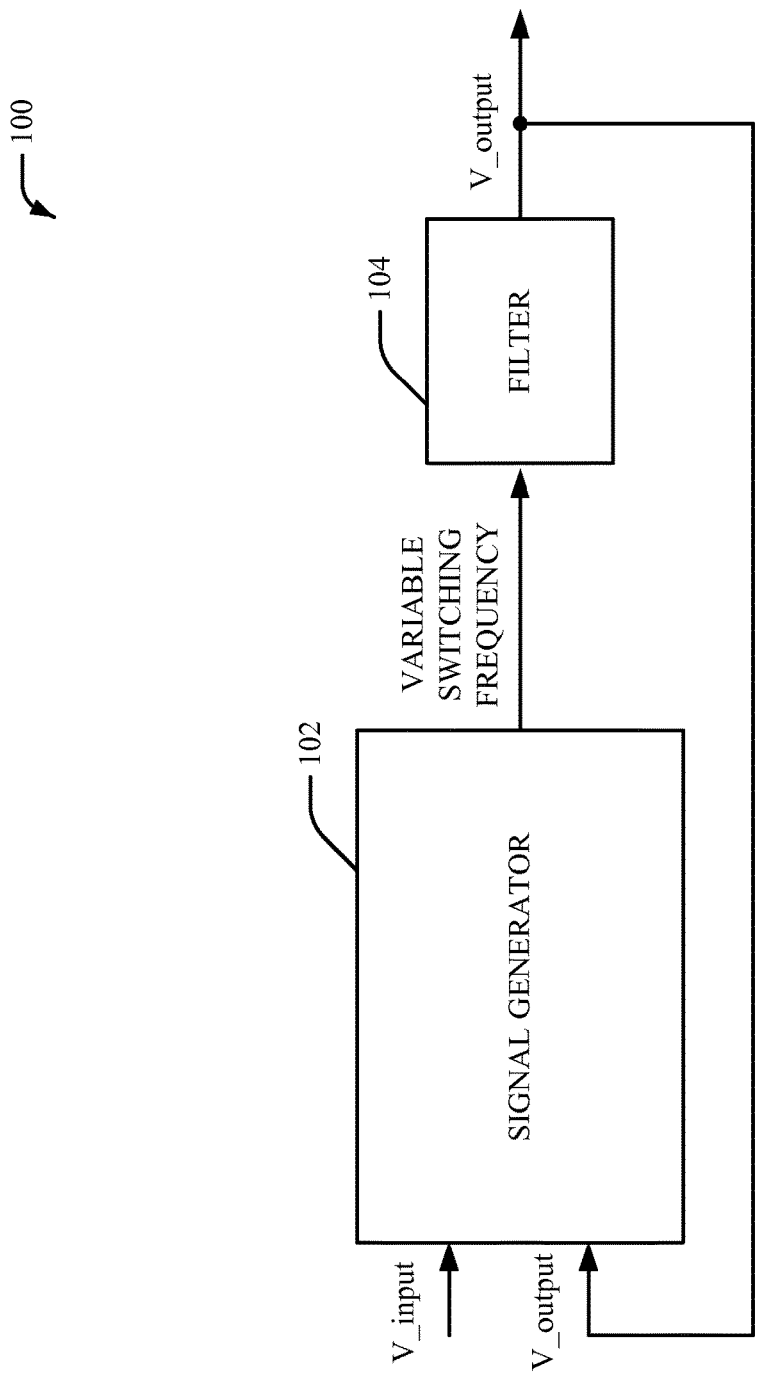
FIG. 1 is a block diagram of an example system for providing a variable switching frequency as a function of an input voltage and/or an output voltage, according to an embodiment of the subject disclosure.

Referring to FIG. 1, illustrated is a block diagram of a system 100 for providing a variable switching frequency as a function of an input voltage (e.g., V_input) and/or an output voltage (e.g., V_output). The system 100 includes a signal generator 102 and a filter 104. The system 100 can be implemented in a power supply controller and/or a power supply regulator. In one example, the system 100 can be implemented in a switching mode power supply (SMPS). For example, the system 100 can be implemented in a DC-DC converter (e.g., an adaptive on-time DC-DC converter) for a SMPS. In one example, the system 100 can be implemented in connection with a step-down DC-DC converter. For example, the system 100 can be implemented in connection with a buck converter (e.g., a buck converter that operates using adaptive on-time control). In another example, the system 100 can be implemented in connection with a step-up DC-DC converter. For example, the system 100 can be implemented in connection with a boost converter.

The signal generator 102 can be implemented as a controller. For example, the signal generator 102 can be implemented as a DC-DC controller (e.g., an adaptive on-time DC-DC controller). In another example, the signal generator 102 can be implemented as a current mode controller. In yet another example, the signal generator 102 can be implemented as a voltage mode controller. However, it is to be appreciated that the signal generator 102 can be implemented as a different type of component that provides a pulsed signal (e.g., a pulse by pulse signal, a pulse width modulation (PWM) signal, etc.). The signal generator 102 receives the input voltage V_input and the output voltage V_output. The input voltage V_input can be an input supply voltage and the output voltage V_output can be an output supply voltage. In one example, the input voltage V_input and/or the output voltage V_output can be received from a DC-DC converter. For example, the input voltage V_input can be a DC input voltage provided to a DC-DC converter and/or the output voltage V_output can be a DC output voltage generated by a filter (e.g., the filter 104). In another example, the input voltage V_input can be a DC input voltage provided to a controller (e.g., the signal generator 102) and/or the output voltage V_output can be a DC output voltage generated by a controller (e.g., the signal generator 102). However, it is to be appreciated that the input voltage V_input can be an input voltage provided to another type of component and/or the output voltage V_output can be an output voltage generated by another type of component.

The signal generator 102 can be configured to generate a switching frequency (e.g., VARIABLE SWITCHING FREQUENCY) based on the input voltage V_input and/or the output voltage V_output. For example, the switching frequency (e.g., the switching period) can increase or decrease (linearly or non-linearly) as a function of the input voltage V_input and/or the output voltage V_output. In one example, the signal generator 102 can be configured to generate a switching frequency for a PWM signal based on the input voltage V_input and/or the output voltage V_output. As such, the switching frequency generated by the signal generator 102 can be varied based on the input voltage V_input and/or the output voltage V_output (e.g., the signal generator 102 can generate a variable switching frequency). The switching frequency can be a switching frequency for a switch (e.g., a mechanical switch or an electrical switch). For example, the switch can be a switch of a SMPS. In one example, the signal generator 102 can include the switch. In another example, the filter 104 can include the switch.

The filter (e.g., LC filter) 104 can be configured to provide a regulated DC voltage based on the switching frequency provided by the signal generator 102. For example, the filter 104 can be configured to generate a DC output voltage (e.g. the voltage output V_output) based at least in part on the switching frequency (e.g., a PWM signal with the switching frequency) generated by the signal generator 102. The signal generator 102 can be configured to adaptively change (e.g., adjust, modify, alter, etc.) the switching frequency at different input voltages and/or output voltages so that inductor ripple current (e.g., peak to peak current of an inductor in the filter 104) is kept relatively constant (e.g., within a relatively narrow range, within a specified range, etc.). For example, the signal generator 102 can generate a variable switching frequency in order to limit range of inductor ripple current (e.g., inductor ripple current of an inductor in the filter 104). As such, inductor ripple current can be kept constant by adaptively changing the switching frequency at various input voltage values and/or output voltage values. Therefore, a constant inductor current ripple can provide for accurate over-current protection trip point (e.g., by employing a valley current sensing method).

In one example, the switching frequency generated by the signal generator 102 can be varied based on the input voltage V_input and/or the output voltage V_output in order to minimize components in the filter 104. For example, the switching frequency generated by the signal generator 102 can be varied based on the input voltage V_input and/or the output voltage V_output in order to minimize active components and/or passive components (e.g., inductors and/or capacitors) in the filter 104. In another example, the switching frequency generated by the signal generator 102 can be varied based on the input voltage V_input and/or the output voltage V_output in order to allow a single inductor to be implemented in the filter 104. Thus, a SMPS can be designed with a single inductor for a wide input voltage range and/or a wide output voltage range (e.g., a single inductor can be configured for a wide range of applications).

As such, the signal generator 102 can provide and/or control a variable switching frequency to reduce components needed for filtering (e.g., by the filter 104). Therefore, size of a filter (e.g., filter 104) and/or cost for filtering (e.g., by the filter 104) can be reduced. Furthermore, the signal generator 102 can provide a variable switching frequency in order to allow wide input voltage and/or wide output voltage functionality for a power supply (e.g., SMPS). Therefore, the signal generator 102 can be utilized in a wide range of applications. As such, manufacturing costs can be reduced and/or efficiency of component design can be improved.

Figure 2:
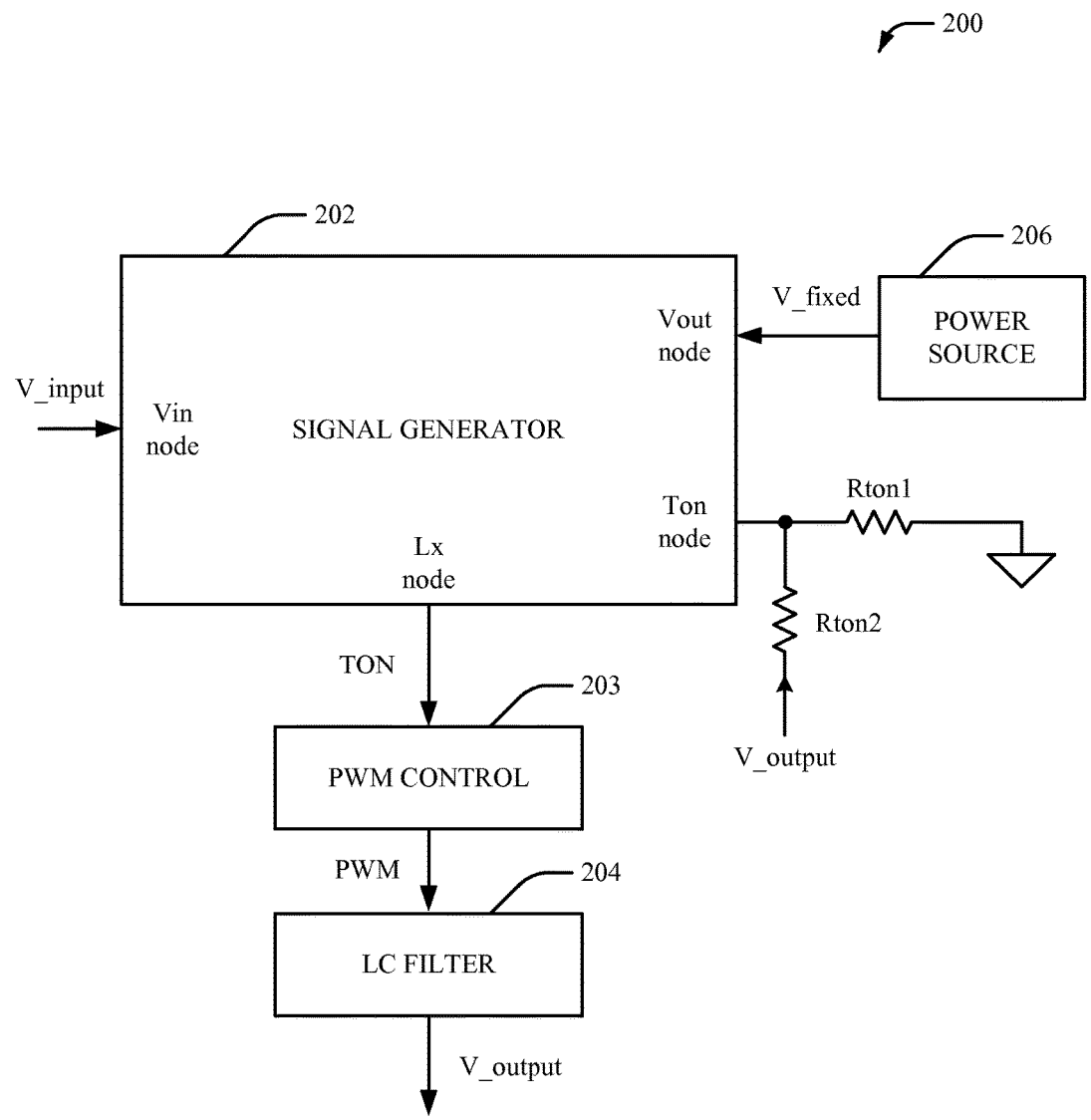
FIG. 2 is a block diagram of another example system for providing a variable switching frequency as a function of an input voltage and/or an output voltage, according to an embodiment of the subject disclosure.

Referring to FIG. 2, illustrated is an example, non-limiting embodiment of a system for providing a variable switching frequency as a function of an input voltage and/or an output voltage in accordance with various aspects described herein. System 200 includes a signal generator 202, a PWM control 203, a filter (e.g., LC filter) 204 and a power source 206. The signal generator 202 can correspond to the signal generator 102 and/or the LC filter 204 can correspond to the filter 104.

The signal generator 202 (e.g., the controller 202) includes an input voltage terminal (e.g., node, pin) Vin, an output voltage terminal (e.g., node, pin) Vout, a switching frequency adjustment terminal (e.g., node, pin) Ton and a switching phase terminal (e.g., node, pin) Lx. In one example, the Ton terminal can be an on-time programming input terminal (e.g., a terminal to set the on-time for a PWM signal). The Vout terminal can be implemented as an output voltage sense terminal (e.g., an output voltage sensing terminal). In one example, the Vout terminal can be configured to receive a ramp signal (e.g., a reference ramp signal) to generate a PWM signal. As such, the Vout terminal can be functionally an input for the signal generator 202. The Ton terminal can be implemented to set a switching frequency for a power supply (e.g., a SMPS). The Lx terminal can provide an on-time signal (e.g., TON) to the PWM control 203. The on-time signal TON can be an on-time for a PWM signal (e.g., a pulse width for a PWM signal, a pulse duration for a PWM signal, an adaptive on-time pulse duration for a PWM signal, etc.). The PWM control 203 can generate a PWM signal (e.g., PWM) based on the on-time signal TON. Furthermore, the PWM control 203 can be implemented to regulate a duty cycle for the PWM signal and/or to regulate the output voltage V_output. The Vin terminal, the Vout terminal, the Ton terminal and/or the Lx terminal can be implemented as input terminals and/or output terminals for the signal generator 202.

The signal generator 202 can be configured to generate a variable switching frequency (e.g., a variable switching frequency for the PWM signal). In the non-limiting example shown in FIG. 2, the Vout terminal is electrically coupled to the power source 206. The power source 206 can be implemented as a fixed power source. As such, the Vout terminal can receive a fixed voltage (e.g., V_fixed) from the power source 206. In one example, the power source 206 can be an external power source. In another example, the power source 206 can be a low drop out (LDO) power source. Therefore, the Vout terminal can receive a voltage different than output voltage (e.g., the output voltage V_output) generated by a DC-DC converter (e.g., the Vout terminal can receive a different voltage than output voltage generated by a DC-DC converter for a load). The Ton terminal is electrically coupled to a resistor Rton1 and a resistor Rton2. The resistor Rton1 is also electrically coupled to ground and the resistor Rton2 is also electrically coupled to (e.g., a terminal of the resistor Rton2 receives) the output voltage V_output. In one example, the resistor Rton2 includes a larger resistance value than the resistor Rton1. In another example, the resistor Rton1 includes a larger resistance value than the resistor Rton2. In yet another example, the resistor Rton1 includes a resistance value equal to the resistor Rton2.

The signal generator 202 can provide the on-time signal TON to generate the PWM signal (e.g., via the PWM control 203) for the LC filter 204. The switching frequency of the PWM signal can be varied based on the input voltage V_input, the output voltage V_output and/or the fixed voltage V_fixed provided by the power source 206. For example, the switching frequency generated by the signal generator 202 can be adjusted by choosing a resistance value for the resistor Rton2, by adjusting the fixed voltage V_fixed, by adjusting the input voltage V_input and/or by adjusting the output voltage V_output. As such, the switching frequency can be adaptively changed based at least in part on the input voltage V_input and/or the output voltage V_output.

The LC filter 204 can be configured to provide a regulated DC voltage (e.g., V_output) based on the switching frequency provided by the signal generator 202. The signal generator 202 can be configured to adaptively change the switching frequency (e.g., change the switching frequency based at least in part by choosing a resistance value for the resistor Rton2, by adjusting the fixed voltage V_fixed, by adjusting the input voltage V_input and/or by adjusting the output voltage V_output) so that inductor ripple current (e.g., peak to peak current) of the LC filter 204 is kept approximately constant. As such, the signal generator 202 can adaptively modify the switching frequency at a plurality of input voltages and/or a plurality of output voltages in order to maintain a constant peak to peak current for an inductor of the LC filter 204.

In one example, the switching frequency generated by the signal generator 202 can be varied (e.g., by choosing a resistance value for the resistor Rton2, by adjusting the fixed voltage V_fixed, by adjusting the input voltage V_input and/or by adjusting the output voltage V_output) in order to minimize inductor components and/or capacitor components in the LC filter 204. However, it is to be appreciated that the switching frequency generated by the signal generator 202 can be varied in order to minimize other components (e.g., other active components and/or other passive components) in the LC filter 204. In another example, the switching frequency generated by the signal generator 202 can be varied (e.g., by choosing a resistance value for the resistor Rton2, by adjusting the fixed voltage V_fixed, by adjusting the input voltage V_input and/or by adjusting the output voltage V_output) in order to allow a single inductor to be implemented in the LC filter 204. As such, the signal generator 202 can provide a variable switching frequency to reduce components needed for filtering (e.g., by the LC filter 204). Therefore, size and/or cost of the LC filter 204 can be reduced. Furthermore, the signal generator 202 can provide a variable switching frequency in order to provide wide input voltage and/or wide output voltage functionality for a DC-DC converter and/or a power supply (e.g., a SMPS).

Figure 3:
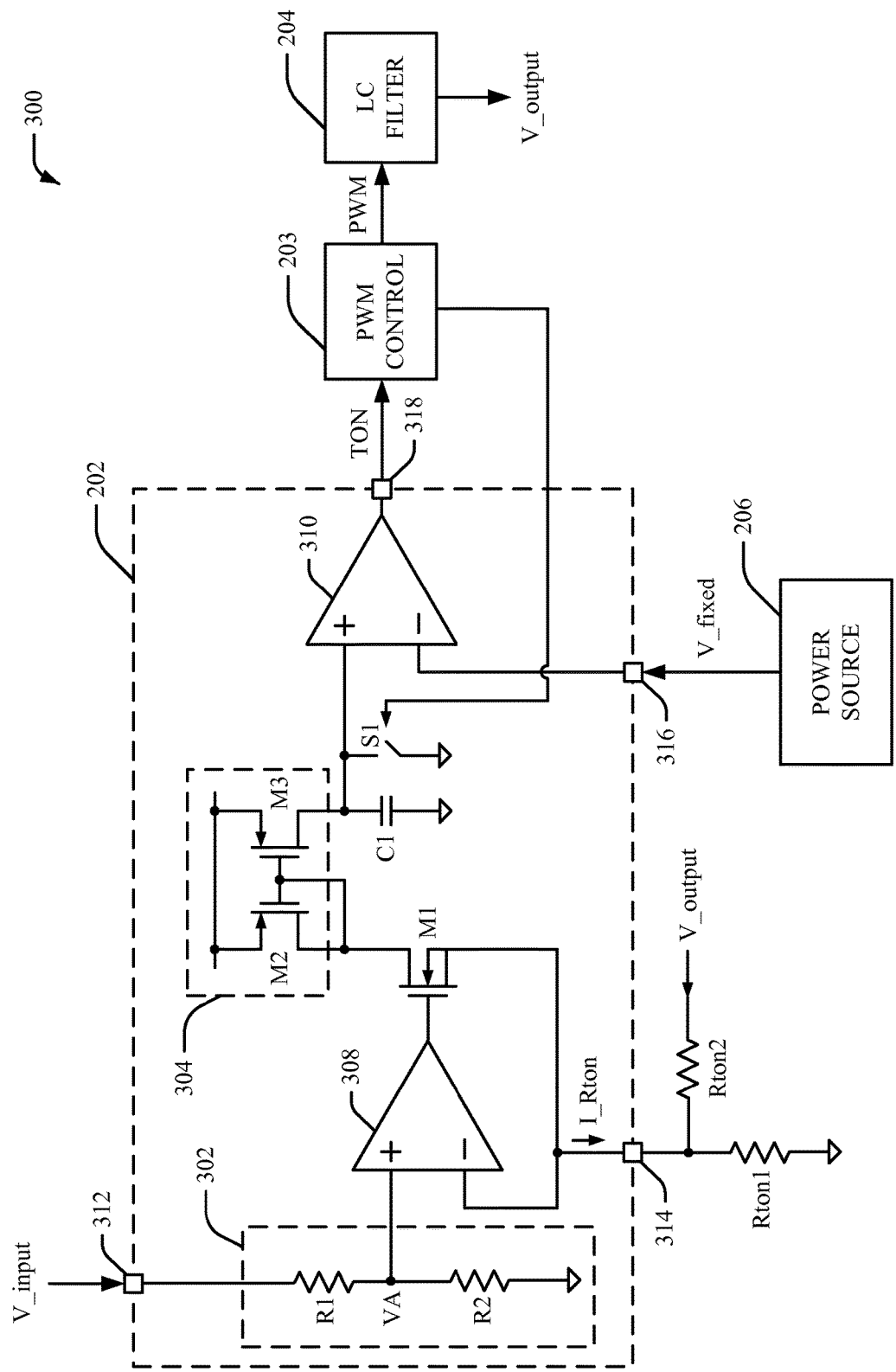
FIG. 3 is a circuit diagram illustrating an example, non-limiting embodiment of a system for providing a variable switching frequency as a function of an input voltage and/or an output voltage, according to an embodiment of the subject disclosure.

Referring now to FIG. 3, a circuit diagram illustrating an example, non-limiting embodiment of a system for providing a variable switching frequency as a function of an input voltage and/or an output voltage in accordance with various aspects described herein. System 300 includes the signal generator 202 (e.g., the controller 202), the PWM control 203, the LC filter 204 and the power source 206. The signal generator 202 includes a resistor divider stage 302, a current mirror stage 304, an amplifier (e.g., error amplifier) 308, a comparator 310, a MOSFET M1, a capacitor C1 and a switch S1. The current divider stage 302 includes a resistor R1 and a resistor R2. The current mirror stage 304 includes a MOSFET M2 and a MOSFET M3. The signal generator 202 also includes Vin node 312, Ton node 314, Vout node 316 and Lx node 318.

The resistor Rton1 (e.g., a first resistor) can be electrically coupled to the Ton node 314. The resistor Rton2 (e.g., a second resistor) can be electrically coupled to the Ton node 314 and the output voltage V_output. The power source 206 (e.g., a fixed power source) can be electrically coupled to the Vout node 316. The signal generator 202 can generate a switching frequency as a function of at least the input voltage V_input and the output voltage V_output. For example, an on-time signal TON for the PWM signal with the switching frequency can be provided at the Lx node 318. Additionally, the switching frequency can be generated as a function of the fixed voltage V_fixed provided by the fixed power source 206. The comparator 310 can be electrically coupled to the current mirror stage 304 and the Vout node 316. For example, a positive terminal (e.g., non-inverting terminal) of the comparator 310 can be electrically coupled to the current mirror stage 304 and a negative terminal (e.g., the inverting terminal) of the comparator 310 can be electrically coupled to the Vout node 316. In one example, the comparator 310 can be implemented as an on-time (TON) generator (e.g., a pulse width modulator). As such, the comparator 310 can be configured to generate an on-time signal TON (e.g., a pulse width, a pulse duration, etc) for the PWM signal. The amplifier 308 can be electrically coupled to the resistor divider stage 302, the current mirror stage 304 and the Ton terminal 314. For example, a positive terminal (e.g., non-inverting terminal) of the amplifier 308 can be electrically coupled to the resistor divider stage 302 and a negative terminal (e.g., the inverting terminal) of the amplifier 308 can be electrically coupled to the current mirror stage 304 (e.g., via the MOSFET M1) and the Ton terminal 314. The output of the amplifier 308 can be electrically coupled to the MOSFET M1.

Voltage provided by the resistor divider stage 302 is connected (e.g., electrically coupled) to the positive terminal of the amplifier 308. The input of the amplifier 308 is high impedance. As such, the amplifier 308 can be regarded as open circuit in circuit analysis. Therefore, the voltage at node VA is V_input/10.

The MOSFET M1 (e.g., current provided by the Ton terminal 314) includes current going into resistor Rton1 and the current going into resistor Rton2. As such, the total current provided by the Ton terminal 314 is represented by the following equation:

$$I\_Rton = \frac{V\_input}{10 \cdot R_{ton1}} + \frac{\left(\frac{V\_input}{10} - V\_output\right)}{R_{ton2}} = V\_input\left(\frac{1}{10}\left(\frac{1}{R_{ton1}} + \frac{1}{R_{ton2}}\right)\right) - \frac{V\_output}{R_{ton2}}$$

When resistor Rton1 and resistor Rton2 are selected to have a ratio of Rton2=9*Rton1, the above equation becomes:

$$I\_Rton = \frac{V\_input - V\_output}{R_{ton2}} = \frac{V\_input - V\_output}{9 \cdot R_{ton1}}$$

As such, the current I_Rton is mirrored by MOSFET M1 and MOSFET M2 which is used to charge the capacitor C1. Therefore, on-time (e.g., switching frequency adjustment) Ton (with a capacitance value of the capacitor C1 equal to C) is represented by the following equation:

$$Ton = R_{ton2} \cdot C \cdot K \frac{V\_fixed}{V\_input - V\_output},$$

where K is a proportional ratio factor

For a step-down converter (e.g., a buck converter), inductor current ripple is calculated using the following equation:

$$iL_{pk\_pk} = \frac{(V\_input - V\_output) \cdot Ton}{L},$$

where L is inductance

For example, L can be an inductance value of an inductor (e.g., a single inductor) included in the LC filter 204. As such, by inserting switching frequency adjustment Ton into the above equation, inductor current ripple can be determined to be the following:

$$iL_{pk\_pk} = R_{ton2} \cdot C \cdot K \cdot \frac{V\_fixed}{L}$$

For a regulated step-down switching converter (e.g., a buck converter), an input voltage Vin, an output voltage Vout, on-time (e.g., switching frequency adjustment) Ton and switching frequency Ts are related by the following equation:

$$\frac{Vin}{Vout} = \frac{Ton}{Ts}$$

In one example, the switching frequency can be a switching frequency of the switch S1. The switch S1 can receive a signal from the PWM control 203. As such, switching frequency Ts can be calculated by the following equation:

$$Ts = \frac{V\_input}{V\_output} \cdot R_{ton2} \cdot C \cdot K \frac{V\_fixed}{V\_input - V\_output} = R_{ton2} \cdot C \cdot V\_fixed \cdot K \frac{V\_input}{V\_output \cdot (V\_input - V\_output)}$$

Therefore, the switching frequency (switching period) Ts can be adjusted (e.g., controlled) by adjusting a resistance value of the resistor Rton2, by adjusting the fixed voltage V_fixed, by adjusting the input voltage V_input and/or by adjusting the output voltage V_output. Furthermore, the switching frequency Ts can be adaptively changed based on the input voltage Vin and/or the output voltage Vout such that inductor ripple current $iL_{pk\_pk}$ (e.g., an inductor ripple current level) is kept constant (e.g., within a certain range). As such, constant inductor ripple modulation can be provided to the LC filter 204.

Figure 4:
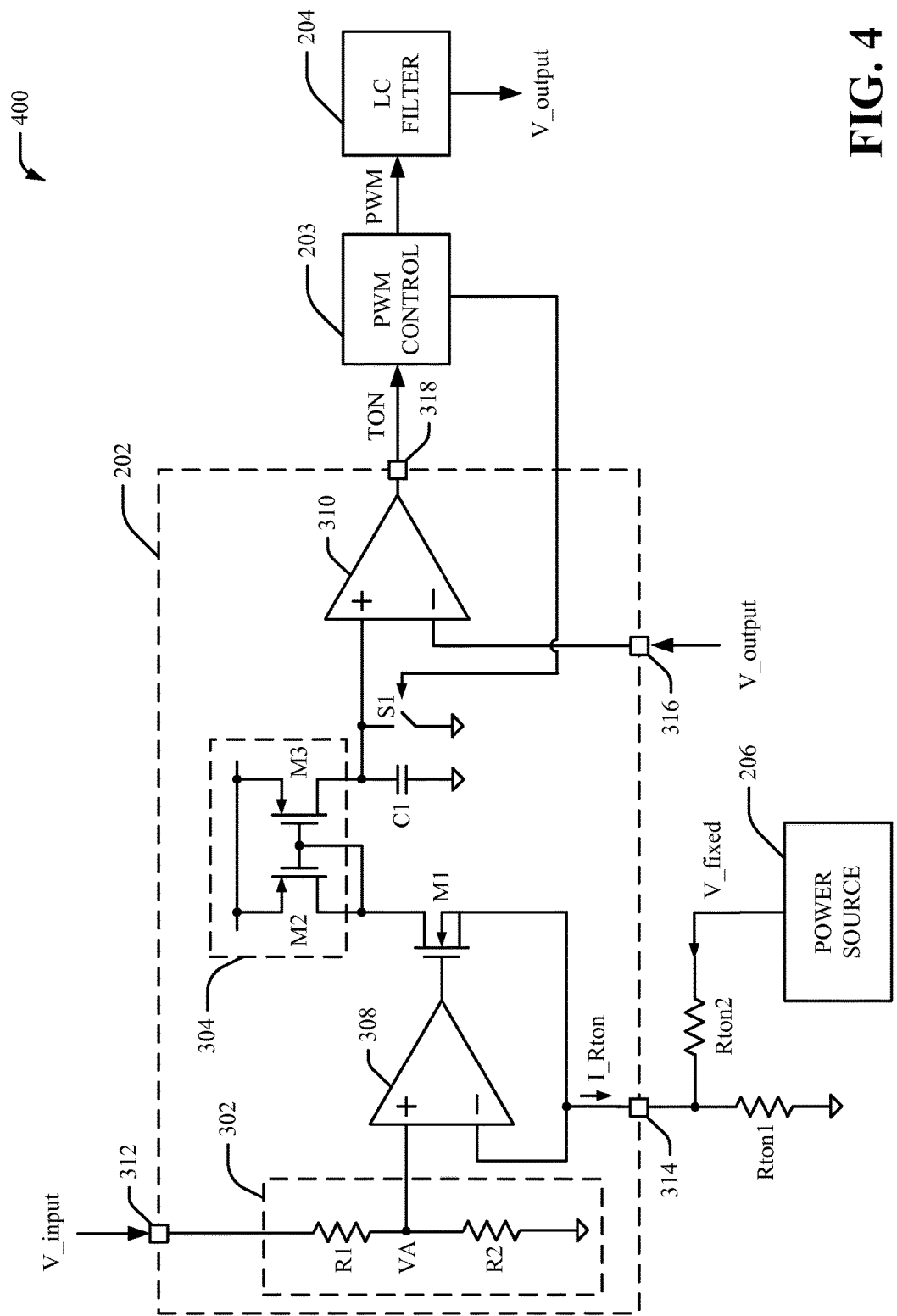
FIG. 4 is a block diagram of yet another example system for providing a variable switching frequency as a function of an input voltage and/or an output voltage, according to an embodiment of the subject disclosure.

Referring now to FIG. 4, illustrated is another example, non-limiting embodiment of a system for providing a variable switching frequency as a function of an input voltage and/or an output voltage in accordance with various aspects described herein. System 400 includes the signal generator 202 (e.g., the controller 202), the PWM control 203, the LC filter 204 and the power source 206. The signal generator 202 includes the resistor divider stage 302, the current mirror stage 304, the amplifier (e.g., error amplifier) 308, the comparator 310, the MOSFET M1, the capacitor C1 and the switch S1. The current divider stage 302 includes the resistor R1 and the resistor R2. The current mirror stage 304 includes the MOSFET M2 and the MOSFET M3. The signal generator 202 also includes the Vin node 312, the Ton node 314, the Vout node 316 and the Lx node 318.

The signal generator 202 can be configured to generate a variable switching frequency (e.g., a variable switching frequency for the PWM signal). In the non-limiting example shown in FIG. 4, the Vout terminal 316 is electrically coupled to the output voltage V_output. The Ton terminal 314 is electrically coupled to the resistor Rton1 and the resistor Rton2. The resistor Rton1 is also electrically coupled to ground and the resistor Rton2 is electrically also coupled to the power source 206. The power source 206 can be implemented as a fixed power source. As such, the resistor Rton2 can be electrically coupled to the fixed voltage V_fixed provided by the power source 206. In one example, the power source 206 can be an external power source. In another example, the power source 206 can be an LDO power source. As such, a lower input voltage value V_input will result in a lower switching frequency value generated by the signal generator 202. Therefore, a large Vout to Vin ratio (e.g., V_output to V_input ratio) can be achieved. Accordingly, the signal generator 202 can provide an adaptive switching frequency based at least in part on the input voltage V_input and/or the output voltage V_output.

Figure 5:
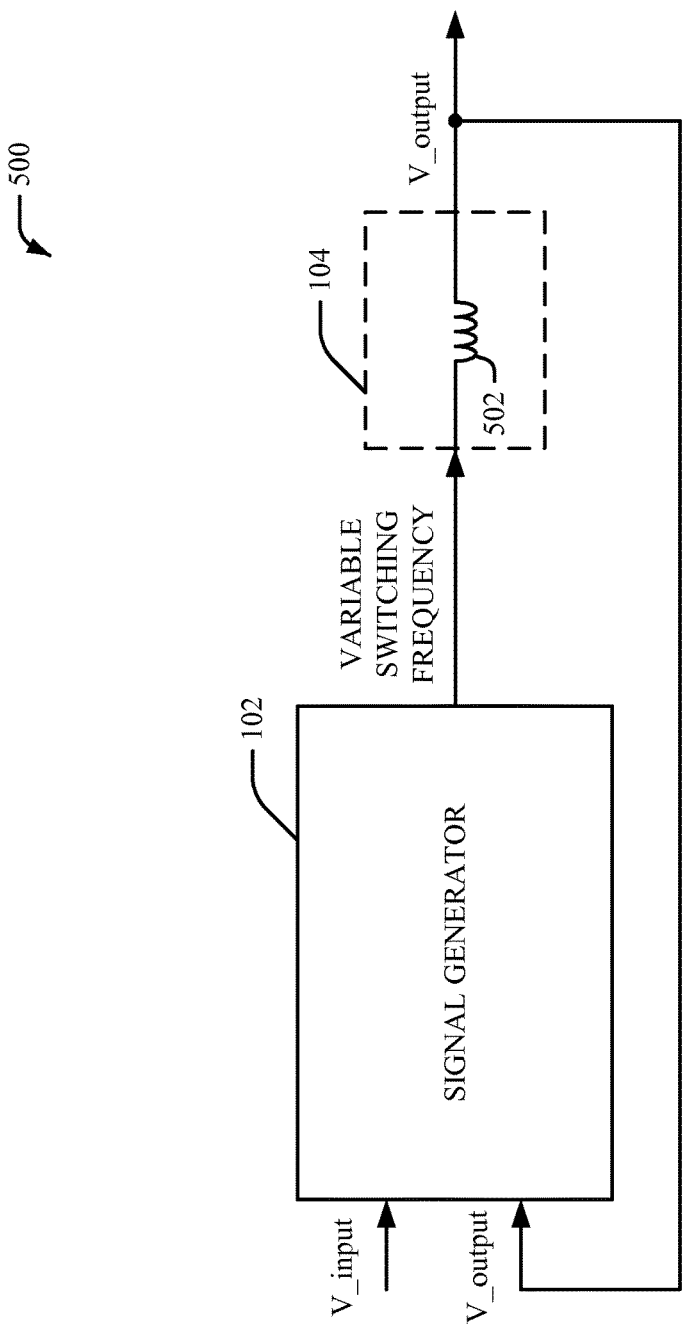
FIG. 5 is a block diagram of an example filter in a system for providing a variable switching frequency as a function of an input voltage and/or an output voltage, according to an embodiment of the subject disclosure.

Referring to FIG. 5, illustrated is an example, non-limiting embodiment of a system for providing and/or modifying a variable switching frequency for a filter in accordance with various aspects described herein. System 500 includes the signal generator 102 (e.g., the signal generator 202) and the filter 104 (e.g., the LC filter 204). The filter 104 includes at least an inductor 502. However, it is to be appreciated that the filter 104 can include additional passive and/or active electronic components.

The signal generator 102 can modify (e.g., control) the switching frequency as a function of the input voltage V_input and/or the output voltage V_output in order to maintain a peak to peak current value of the inductor 502. As such, the inductor 502 can be implemented for various input voltage and/or output voltage requirements for a DC-DC converter. Furthermore, the inductor 502 can be utilized for a wide range of applications (e.g., load requirements).

For example, a SMPS (e.g., the signal generator 102 in a SMPS) can receive a 19V input voltage. The SMPS (e.g., the filter 104 in the SMPS) can generate a 5V output voltage. As such, the signal generator 102 can generate a switching frequency (e.g., a PWM signal with the switching frequency) as a function of the 19V input voltage and the 5V output voltage in order to maintain a peak to peak current value of the inductor 502. Furthermore, at another instance, the SMPS (e.g., the signal generator 102 in the SMPS) can receive a 5.6V input voltage. The SMPS (e.g., the filter 104 in the SMP) can generate a 5V output voltage. As such, the signal generator 102 can modify the switching frequency as a function of the 5.6V input voltage and the 5V output voltage in order to maintain a peak to peak current value of the inductor 502.

Therefore, the signal generator 102 (e.g., the signal generator 202) can generate different switching frequencies (e.g., the signal generator 102 can increase or decrease a switching frequency for different input voltages and/or output voltages) so that the inductor 502 can be used (e.g., a single inductor can be used) for a wide range of input voltages and/or output voltages. Accordingly, a single inductor (e.g., the inductor 502) can be utilized for various input voltage and/or output voltage requirements. As such, the signal generator 102 (e.g., the signal generator 202) can be utilized in a wide range of applications.

Figure 6:
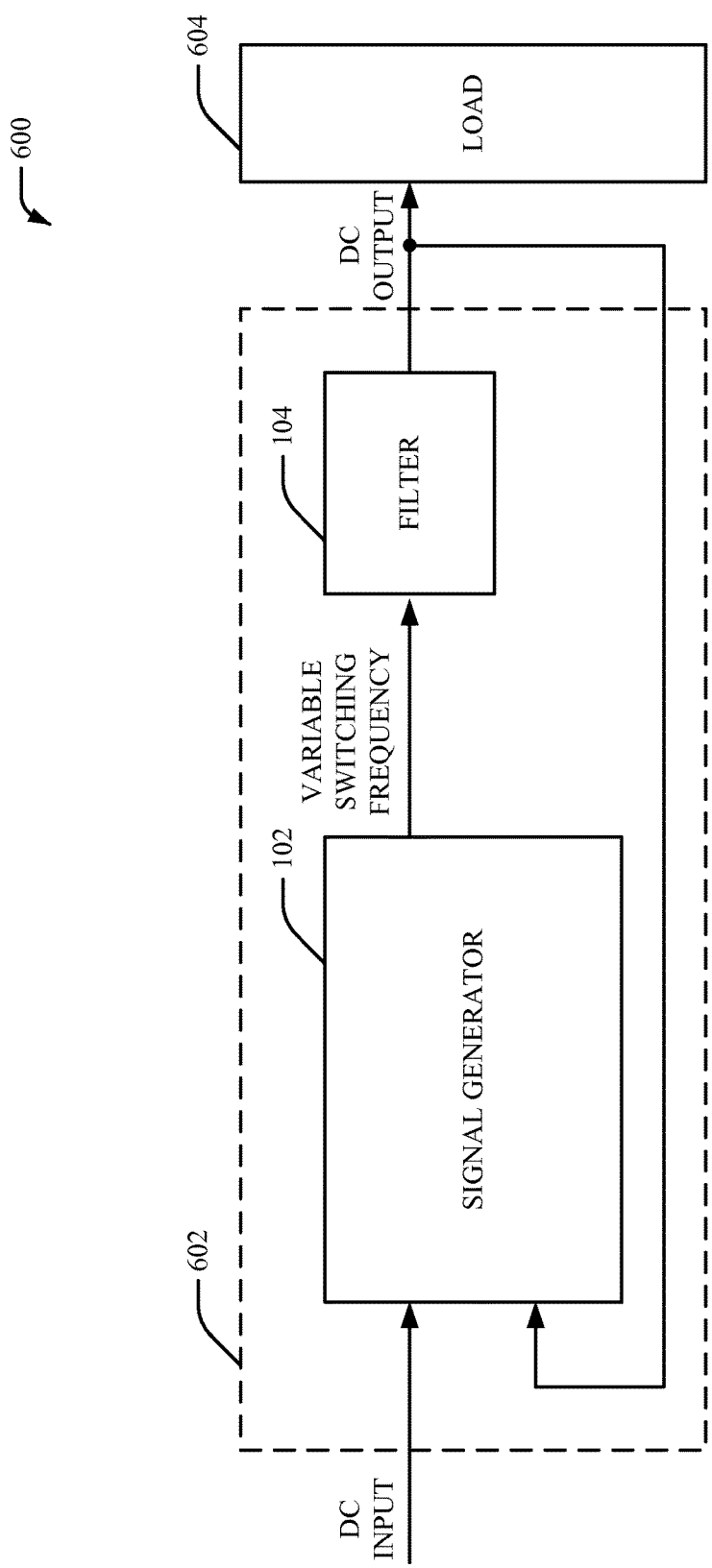
FIG. 6 is a block diagram of an example system that includes a DC-DC converter and a load, according to an embodiment of the subject disclosure.

Referring to FIG. 6, illustrated is an example, non-limiting embodiment of a system for providing and/or modifying a variable switching frequency for a power supply system in accordance with various aspects described herein. System 600 includes a DC-DC converter 602 and a load 604. The DC-DC converter 602 includes at least the signal generator 102 (e.g., the signal generator 202) and the filter 104 (e.g. the LC filter 204). The signal generator 102 can receive an input supply voltage of the DC-DC converter 602 (e.g., DC INPUT) and an output supply voltage of the DC-DC converter 602 (e.g., DC OUTPUT). The output supply voltage is provided to the load 604. It is to be appreciated that the DC-DC converter 602 can include additional components and/or functionalities than shown in FIG. 6. In one example, the DC-DC converter 602 can be implemented as an adaptive on-time DC-DC converter.

The switching frequency of the DC-DC converter 602 (e.g., the switching frequency generated by the signal generator 102) can be altered based on changes to the input supply voltage (e.g., DC input) and/or the output supply voltage (e.g., DC output) to limit range of ripple current, as more fully disclosed herein. As such, a single inductor can be implemented in the filter 104 of the DC-DC converter 602 to allow the DC-DC converter 602 to be utilized in a wide range of applications. Furthermore, the switching frequency of the DC-DC converter 602 can be adapted to provide a desired output voltage (e.g., DC output) for the load 604 (e.g., the switching frequency of the DC-DC converter 602 can be varied to meet filtering requirements of the load 604). Additionally, performance of the DC-DC converter 602 can be optimized and/or regulation provided by the DC-DC converter 602 can be improved.

In view of the example systems described above, methods that may be implemented in accordance with the described subject matter may be better appreciated with reference to the flow charts of FIGS. 7-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 7:
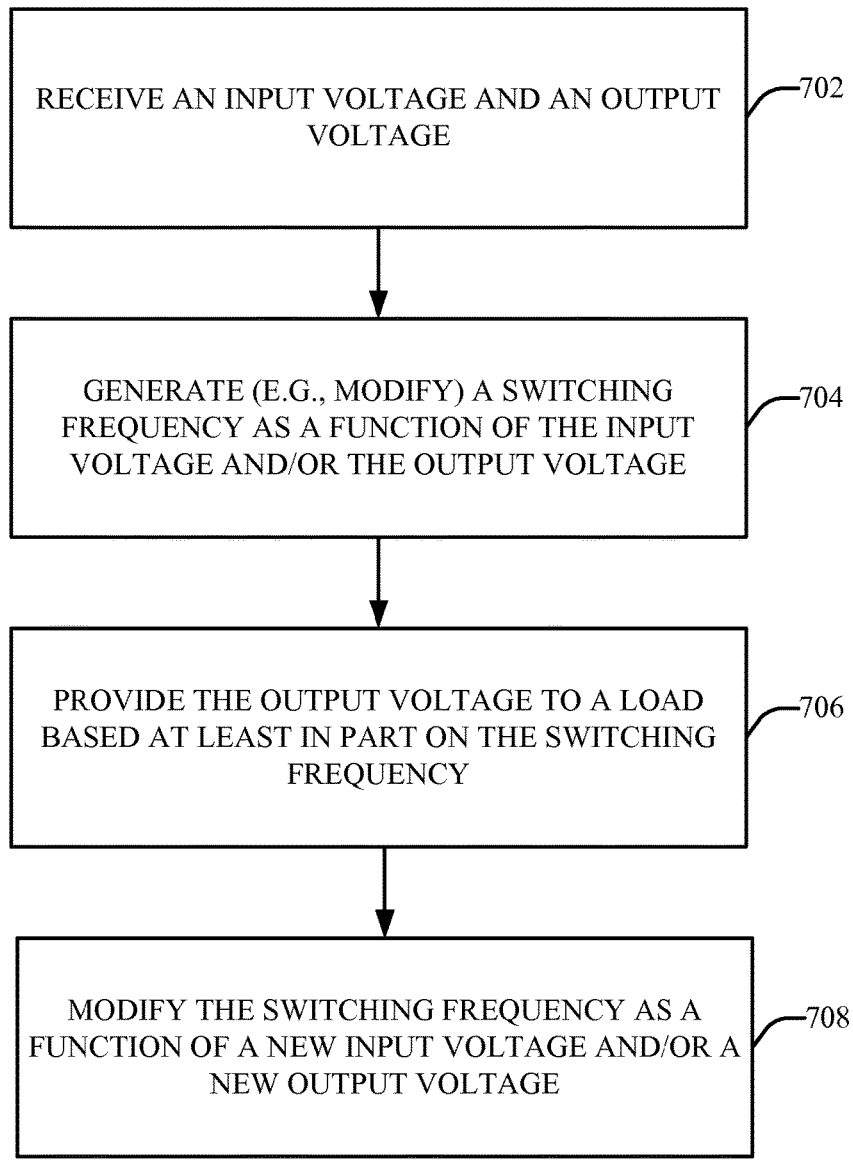
FIG. 7 depicts a flow diagram of an example method for providing flexible switching frequency adjustment for a wide variety of input voltage and/or output voltage ranges, in accordance with an aspect of the subject disclosure.

Referring to FIG. 7, there illustrated is a methodology 700 for providing flexible switching frequency adjustment for a wide variety of input voltage and/or output voltage ranges, according to an aspect of the subject innovation. As an example, methodology 700 can be utilized in a PWM power supply controller and/or a PWM power supply regulator. At 702, an input voltage and an output voltage are received. For example, an input voltage for a DC-DC converter and an output voltage for the DC-DC converter can be received. At 704, a switching frequency is generated (e.g., modified) as a function of the input voltage and/or the output voltage. For example, instead of a fixed switching frequency (e.g., constant switching frequency) for all operating conditions of a DC-DC converter, a switching frequency (e.g., a variable switching frequency) can be generated and/or modified as a function of the input voltage for the DC-DC converter and/or the output voltage for the DC-DC converter. At 706, the output voltage is provided to a load based at least in part on the switching frequency. For example, the DC-DC converter can provide the output voltage to a load based at least in part on the switching frequency. At 708, the switching frequency is modified as a function of a new input voltage and/or a new output voltage. For example, if an input voltage requirement and/or an output voltage requirement for a DC-DC converter changes, the switching frequency can be adaptively modified (e.g., a flexible switching frequency can be provided based on input voltage requirements and/or output voltage requirements).

Figure 8:
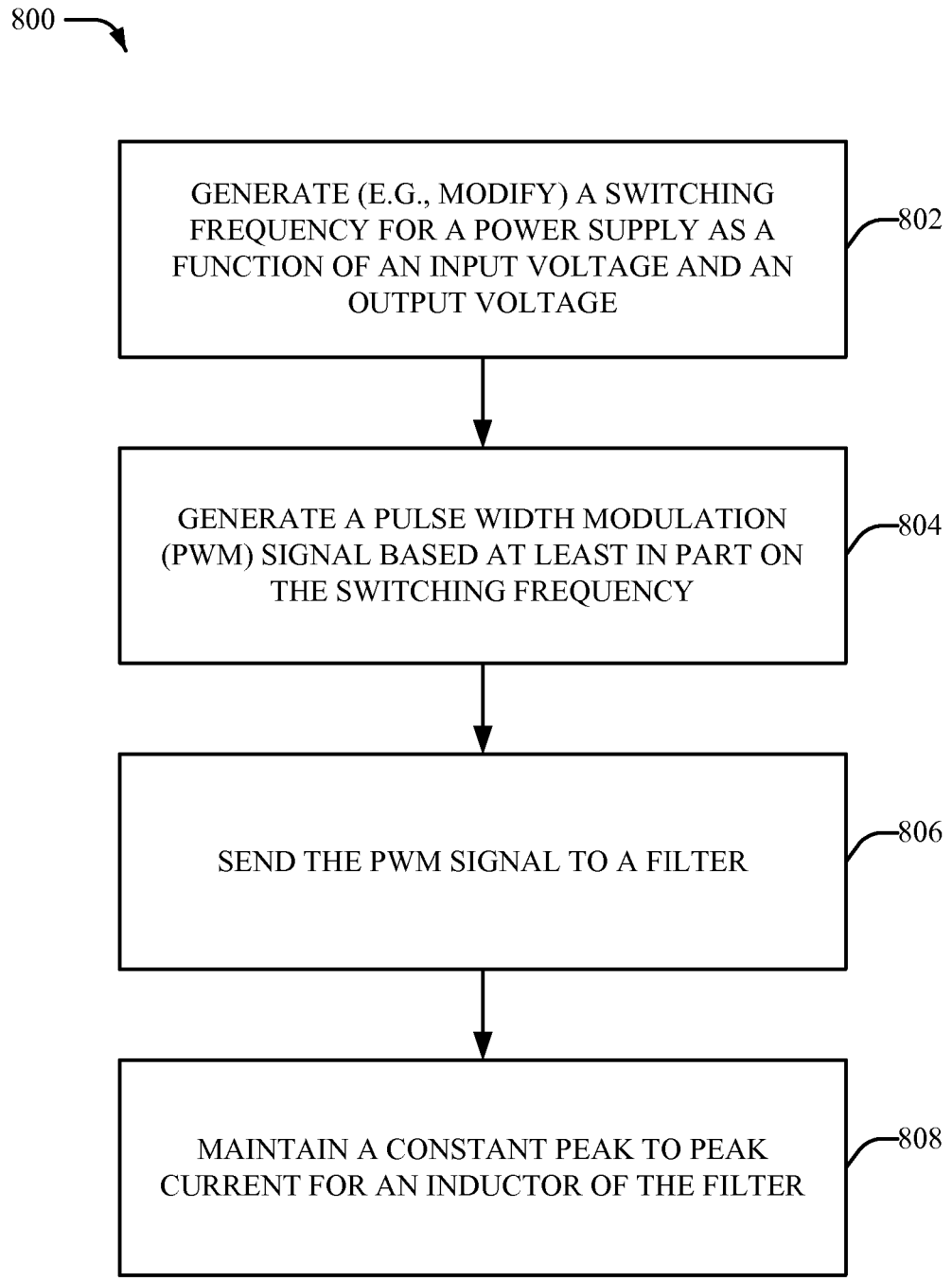
FIG. 8 depicts a flow diagram of an example method for providing flexible switching frequency adjustment for a PWM signal, in accordance with an aspect of the subject disclosure.

Referring now to FIG. 8, there illustrated is a methodology 800 for providing flexible switching frequency adjustment for a PWM signal, according to an aspect of the subject innovation. At 802, a switching frequency is generated (e.g., modified) for a power supply as a function of an input voltage and an output voltage. For example, a switching frequency can be generated (e.g., modified) as a function of an input voltage of the power supply and an output voltage of the power supply. At 804, a pulse width modulation (PWM) signal is generated based at least in part on the switching frequency. For example, a PWM signal that includes the switching frequency can be generated. At 806, the PWM signal is sent to a filter. For example, the PWM signal can be sent to an LC filter (e.g., an LC filter with a single inductor). At 808, a constant peak to peak current for an inductor of the filter can be maintained. For example, a ripple current of an inductor in an LC filter can be maintained. As such, the switching frequency can be generated based at least in part on an input voltage and an output voltage in order to maintain a constant peak to peak current for an inductor of a filter (e.g., a filter that generates the output voltage).

Figure 9:
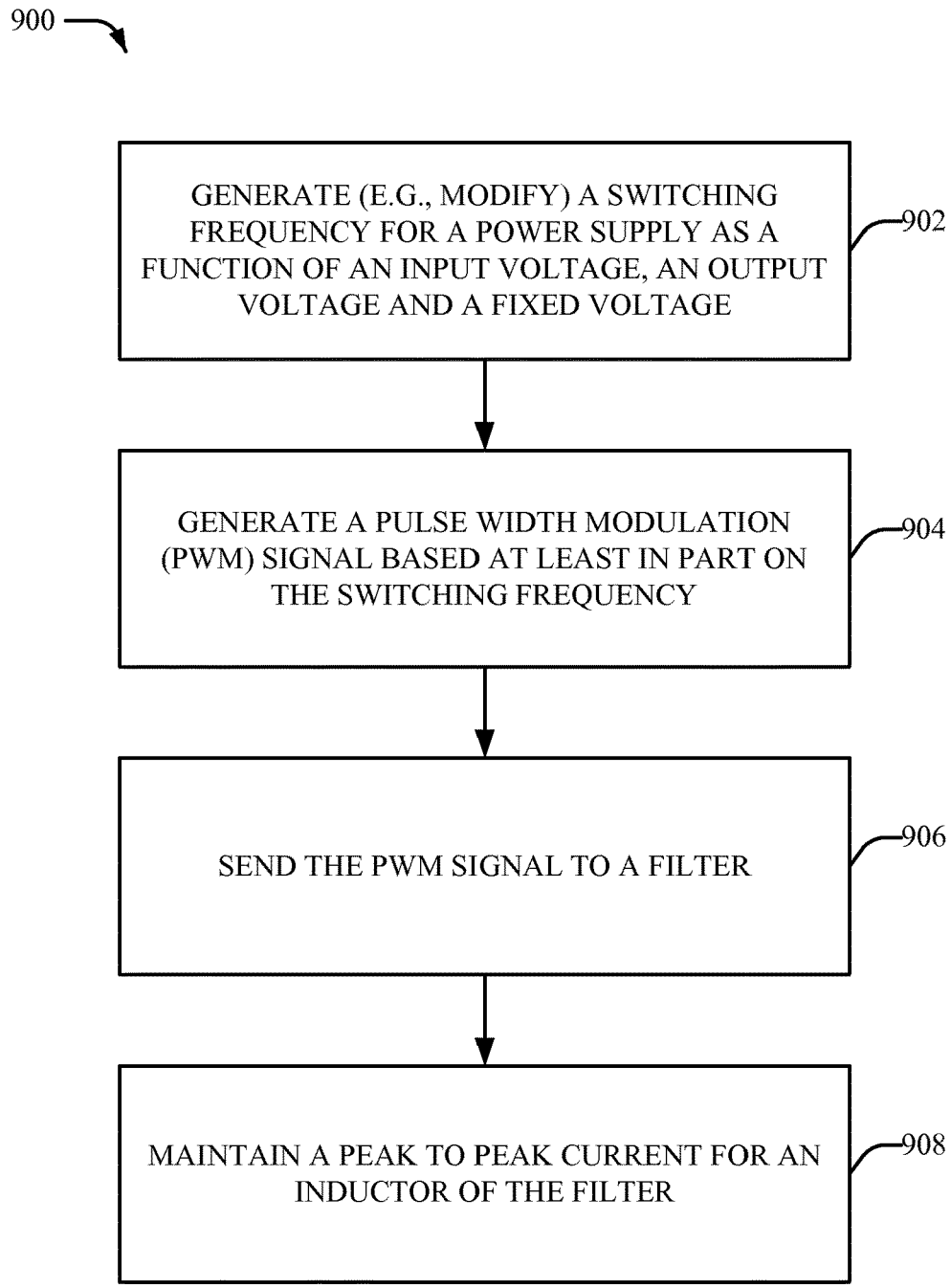
FIG. 9 depicts a flow diagram of another example method for providing flexible switching frequency adjustment for a PWM signal, in accordance with an aspect of the subject disclosure.

Referring now to FIG. 9, there illustrated is a methodology 900 for providing flexible switching frequency adjustment for a PWM signal, according to another aspect of the subject innovation. At 902, a switching frequency is generated (e.g., modified) for a power supply as a function of an input voltage, an output voltage and a fixed voltage. For example, a switching frequency can be generated (e.g., modified) as a function of an input voltage of the power supply, an output voltage of the power supply and a fixed voltage provided by a fixed power source. At 904, a pulse width modulation (PWM) signal is generated based at least in part on the switching frequency. For example, a PWM signal that includes the switching frequency can be generated. At 906, the PWM signal is sent to a filter. For example, the PWM signal can be sent to an LC filter (e.g., an LC filter with a single inductor). At 908, a peak to peak current for an inductor of the filter can be maintained. For example, a constant peak to peak current (or a reduced range of variation of peak to peak current) for an inductor of the filter can be maintained. In one example, a ripple current of an inductor in an LC filter can be maintained. As such, the switching frequency can be generated based at least in part on an input voltage, an output voltage and a fixed voltage in order to maintain a constant peak to peak current for an inductor of a filter (e.g., a filter that generates the output voltage).

Figure 10:
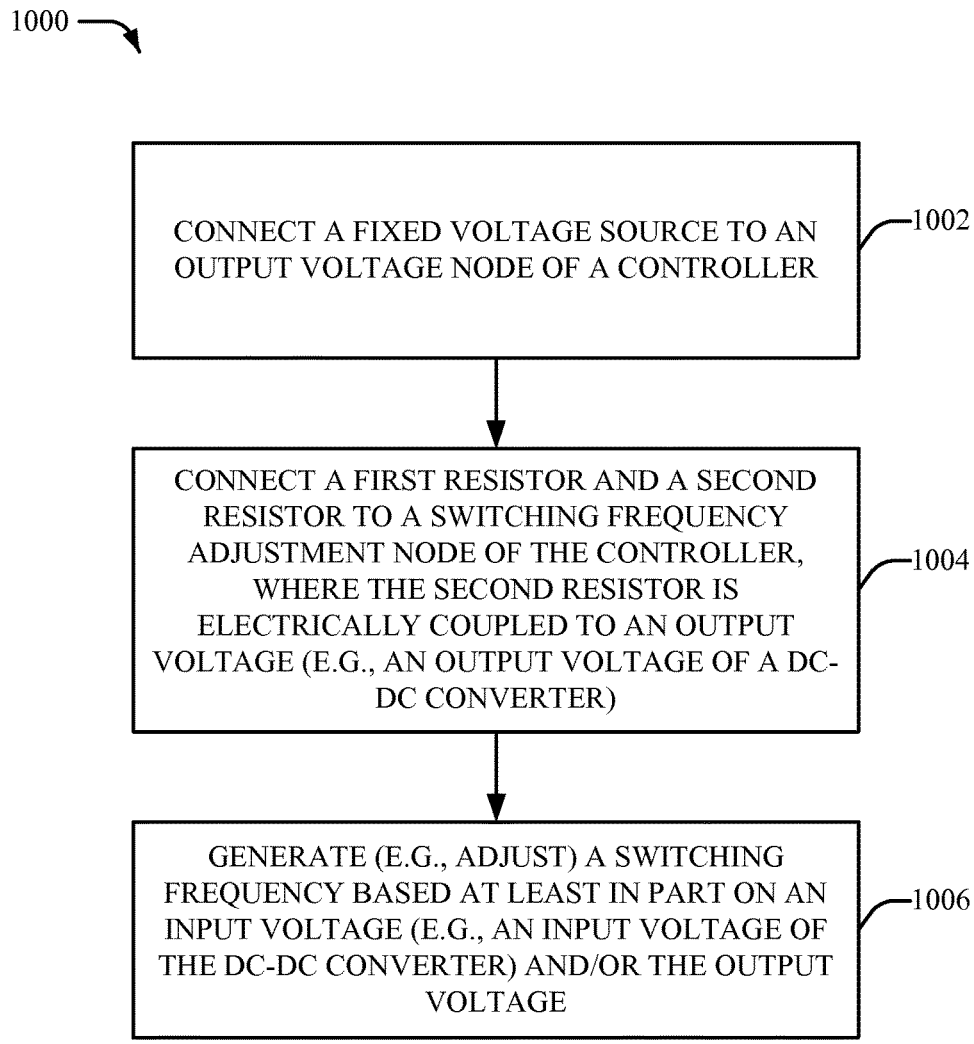
FIG. 10 depicts a flow diagram of an example method for configuring a controller (e.g. a signal generator), in accordance with an aspect of the subject disclosure.

Referring now to FIG. 10, there illustrated is a methodology 1000 for configuring a controller (e.g. a signal generator), according to an aspect of the subject innovation. For example, the methodology 1000 can be implemented to modify a commercially available DC-DC controller (e.g., adaptive on-time DC-DC controller). At 1002, a fixed voltage source is connected to an output voltage node of a controller. For example, a fixed voltage source can provide a fixed voltage to an output voltage node (e.g., an output voltage sense node) of a controller. In one example, the output voltage node can determine a duty cycle (e.g., a leading edge and a trailing edge) for a PWM signal. As such, a fixed voltage can be provided to an output voltage node (e.g., an output voltage sense node) instead of an output voltage. At 1004, a first resistor and a second resistor can be connected to a switching frequency adjustment node of the controller, where the second resistor is electrically coupled to an output voltage (e.g., an output voltage of a DC-DC converter). For example, the output voltage can be electrically coupled to a switching frequency adjustment node (e.g., an on-time programming input node) via the second resistor to generate an on-time signal for an adaptive on-time DC-DC converter. At 1006, a switching frequency is generated (e.g., adjusted) based at least in part on an input voltage (e.g., an input voltage of the DC-DC converter) and/or the output voltage. For example, a switching frequency can be generated and/or varied based at least in part on an input voltage and/or the output voltage provided at the switching frequency adjustment node.

Figure 11:
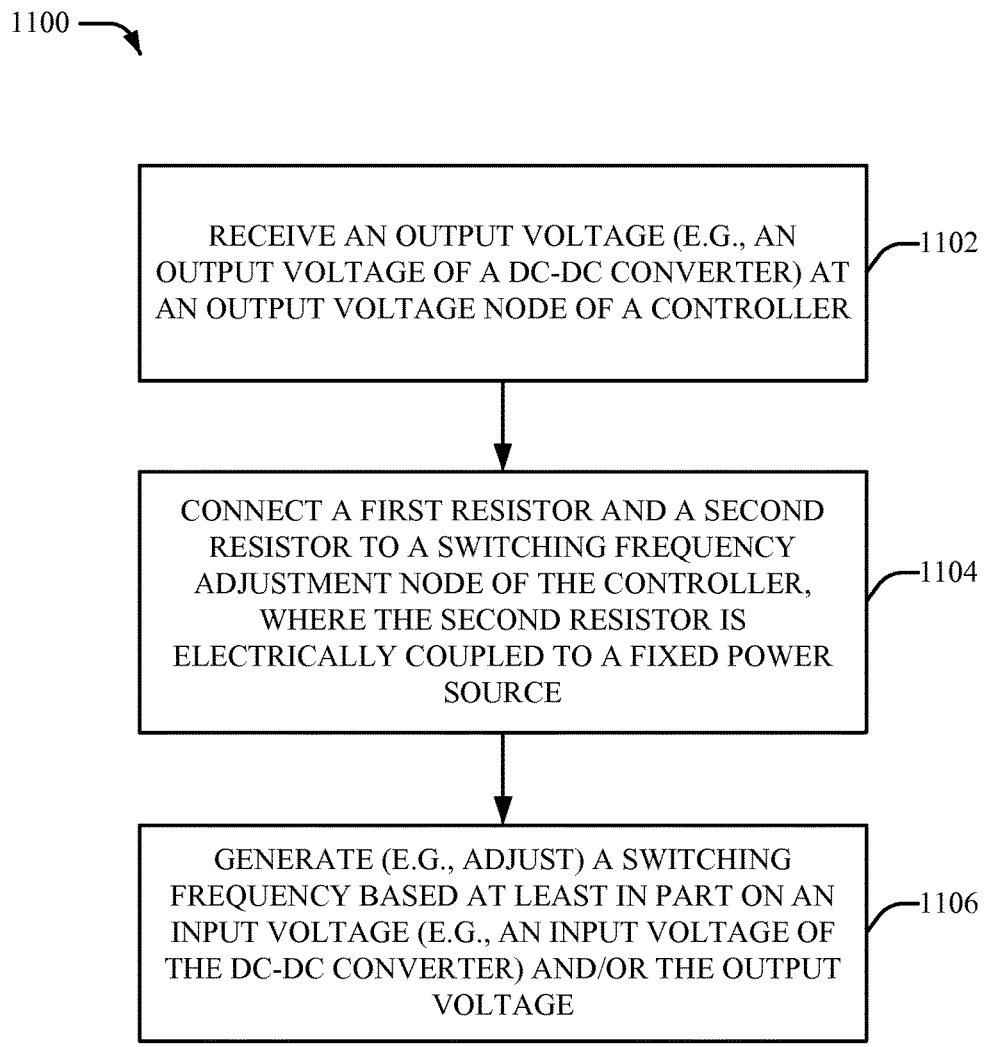
FIG. 11 depicts a flow diagram of another example method for configuring a controller (e.g. a signal generator), in accordance with an aspect of the subject disclosure.

Referring now to FIG. 11, there illustrated is a methodology 1100 for configuring a controller (e.g. a signal generator), according to another aspect of the subject innovation. For example, the methodology 1100 can be implemented to modify a commercially available DC-DC controller (e.g., adaptive on-time DC-DC controller). At 1102, an output voltage is connected to an output voltage node of a controller. For example, an output voltage (e.g., an output voltage of a DC-DC converter) can be provided to an output voltage node (e.g., an output voltage sense node) of a controller. In one example, the output voltage node can directly or indirectly determine a duty cycle (e.g., a leading edge and a trailing edge) for a PWM signal. At 1104, a first resistor and a second resistor can be connected to a switching frequency adjustment node of the controller, where the second resistor is electrically coupled to a fixed power source. For example, a fixed power source can be electrically coupled to a switching frequency adjustment node (e.g., an on-time programming input node) via the second resistor to generate an on-time signal for an adaptive on-time DC-DC converter. At 1106, a switching frequency is generated (e.g., adjusted) based at least in part on an input voltage (e.g., an input voltage of the DC-DC converter) and/or the output voltage. For example, a switching frequency can be generated and/or varied based at least in part on an input voltage and/or the output voltage provided at the output voltage node.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A system, comprising:
a controller that generates a switching frequency for a switch included in a power supply, wherein the controller varies the switching frequency as a function of an input voltage and an output voltage such that an inductor ripple current is kept substantially constant, wherein the switching frequency has a first frequency value based on the input voltage having a first voltage value to achieve a defined duty cycle, wherein the switching frequency has a second frequency value based on the input voltage having a second voltage value,
wherein the first frequency value is less than the second frequency value and wherein the first voltage value is less than the second voltage, and wherein an output terminal of the switch is directly connected to a positive, non-inverting terminal of a comparator, and an output terminal of the comparator is electrically coupled to an input terminal of a pulse width modulator that generates a pulse width for a pulse width modulation signal,
wherein the comparator outputs an adaptive on-time signal that is received by the pulse width modulator, and wherein the output of the pulse width modulator is directly connected to the switch, wherein an input node of the controller is coupled to a resistor and a second resistor, wherein the resistor and the second resistor are coupled to one another at a second terminal, and
wherein the second terminal is directly coupled to a positive, non-inverting terminal of an amplifier, and wherein the negative terminal of the amplifier is directly connected to a first MOSFET and the first MOSFET is coupled between a second MOSFET and a third MOSFET, and wherein the third MOSFET is coupled to a first capacitor that is directly connected to the switch, the switch being distinct from a MOSFET and the switch being distinct from a flip flop; and
a filter that provides the output voltage to a load based at least in part on the pulse width modulation signal, wherein variation of the switching frequency facilitates minimization of active components and passive components in the filter.

2. The system of claim 1, wherein the controller is a direct current (DC)-direct current (DC) controller.

3. The system of claim 1, wherein the filter comprises an inductor.

4. The system of claim 3, wherein the controller adaptively modifies the switching frequency as a function of the input voltage and the output voltage to limit range of the inductor ripple current for the inductor in order to maintain a substantially constant inductor ripple current at different values of the input voltage and at different values of the output voltage.

5. The system of claim 1, wherein the controller generates the pulse width modulation signal based on the switching frequency for the switch.

6. The system of claim 1, wherein the switching frequency is further modified as a function of a fixed voltage provided by a fixed power source.

7. The system of claim 1, wherein the power supply is a switching mode power supply.

8. A system, comprising:
a signal generator that includes an input node, an output node electrically coupled to a fixed power source, and a switching frequency adjustment node electrically coupled to an output voltage, wherein the input node is coupled to a resistor and a second resistor, wherein the resistor and the second resistor are coupled to one another at a terminal, and wherein the terminal is directly coupled to a positive, non-inverting terminal of an amplifier, and wherein the negative terminal of the amplifier is directly connected to a first MOSFET and the first MOSFET is coupled between a second MOSFET and a third MOSFET, and wherein the third MOSFET is coupled to a first capacitor that is directly connected to a switch, the switch being distinct from a MOSFET and the switch being distinct from a flip flop,
wherein the signal generator controls a switching frequency for the switch included in a power supply such that the switching frequency varies as a function of a resistance value of a first resistor directly coupled to the output voltage on a first end and coupled at a second end to a terminal for an on-time signal,
wherein the first resistor is also coupled to a second resistor at the second end of the first resistor, the second resistor being coupled to ground at another end of the second resistor and wherein an output terminal of the switch is directly connected to a positive, non-inverting terminal of a comparator, and an output terminal of the comparator is electrically coupled to an input terminal of an on-time generator that generates a pulse width for a pulse width modulation signal via a pulse width modulation control, and
wherein an output of the pulse width modulation control is directly connected to the switch; and
a filter that comprises an inductor, wherein the filter generates the output voltage for a load based at least in part on the pulse width modulation signal.

9. The system of claim 8, wherein the signal generator controls the switching frequency as a function of the input voltage and the output voltage to limit range of the inductor ripple current for the inductor in order to maintain a substantially constant inductor ripple current at different values of the input voltage and at different values of the output voltage to facilitate over-current protection trip point accuracy employing a valley current sensing method.

10. The system of claim 8, wherein the fixed power source is electrically coupled to another input terminal of the on-time generator.

11. The system of claim 8, wherein the pulse width modulation signal is generated based at least in part on the switching frequency for the switch.

12. The system of claim 8, wherein the switching frequency adjustment node is electrically coupled to a first resistor and a second resistor.

13. The system of claim 12, wherein the second resistor is electrically coupled to the output voltage.

14. The system of claim 13, wherein the first resistor is electrically coupled to ground.

15. A method, comprising:
   receiving an input voltage and an output voltage in a circuit;
   generating a switching frequency for a switch included in a power supply, and wherein the circuit is configured to flexibly adjust the switching frequency by selecting among adjustment of: a resistance value of a first resistor of the circuit; a fixed voltage of the circuit; an input voltage of the circuit; and an output voltage of the circuit, wherein adjustment of the switching frequency can be performed such that inductor ripple current of the circuit is maintained at an approximately constant level and constant inductor ripple modulation is provided to a filter of the circuit;
   generating a pulse width for a pulse width modulation signal via a pulse width modulator that comprises an input terminal electrically coupled to the switch, and wherein the switch is directly connected to a non-inverting input terminal of an amplifier, wherein an output of the pulse width modulator is directly connected to the switch, and wherein the negative terminal of the amplifier is directly connected to a first MOSFET; and
   providing the output voltage to a load based on the pulse width modulation signal, wherein the switch is distinct from a MOSFET and distinct from a flip flop.

16. The method of claim 15, further comprising sending the pulse width modulation signal with the switching frequency to a filter.

17. The method of claim 16, further comprising maintaining a substantially constant inductor ripple current for an inductor of the filter.

18. The method of claim 15, wherein the generating switching frequency further includes generating the switching frequency as a function of a fixed voltage provided by a fixed power source.

19. The method of claim 18, wherein the receiving includes receiving the fixed voltage via an output voltage node and receiving the output voltage via a switching frequency adjustment node.

\* \* \* \* \*